US010514589B2

(12) United States Patent
Cavallaro et al.

(10) Patent No.: US 10,514,589 B2
(45) Date of Patent: Dec. 24, 2019

(54) PROTRUDING CAMERA LENS PROTECTION

(71) Applicant: Motorola Mobility LLC, Chicago, IL (US)

(72) Inventors: Alberto R. Cavallaro, Northbrook, IL (US); Roger W. Harmon, Crystal Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/631,447

(22) Filed: Jun. 23, 2017

(65) Prior Publication Data

US 2018/0373122 A1 Dec. 27, 2018

(51) Int. Cl.

| | |
|---|---|
| ***G03B 17/00*** | (2006.01) |
| ***G03B 11/04*** | (2006.01) |
| ***H04N 5/225*** | (2006.01) |
| ***G03B 17/02*** | (2006.01) |
| ***G03B 17/48*** | (2006.01) |

(52) U.S. Cl.

CPC ............ *G03B 11/041* (2013.01); *G03B 17/02* (2013.01); *G03B 17/48* (2013.01); *H04N 5/2252* (2013.01); *H04N 5/2257* (2013.01); *H04N 5/2258* (2013.01)

(58) Field of Classification Search

CPC .......... G03B 11/04; G03B 11/06; G03B 17/00
USPC .................................. 396/448, 535; 348/373
See application file for complete search history.

(56) References Cited

U.S. PATENT DOCUMENTS

| | | | | |
|---|---|---|---|---|
| 2008/0316121 A1* | 12/2008 | Hobson | .................. | H01Q 1/243 343/702 |
| 2015/0198864 A1* | 7/2015 | Havskjold | ............. | G03B 17/02 455/556.1 |

FOREIGN PATENT DOCUMENTS

| | | | |
|---|---|---|---|
| JP | 2015-169781 | * | 9/2015 |

OTHER PUBLICATIONS

Translation of JP Publication No. 2015-169781; Title: Imaging Device; Inventor: Ito et al.; Publication Date: Sep. 28, 2015. (Year: 2015).*

"Retractable vs non-retractable lenses in compact cameras?",DP Review, https://www.dpreview.com/forums/thread/1878879, Date Jan. 28, 2007-Feb. 1, 2007.

* cited by examiner

*Primary Examiner* — Clayton E. LaBalle
*Assistant Examiner* — Fang-Chi Chang
(74) *Attorney, Agent, or Firm* — McKinney Phillips LLC; Phillip Pippenger

(57) ABSTRACT

A mobile device includes a device housing with an opening there through, the housing having a front external surface and a back external surface. A camera housing is sized to fit within the opening in the device housing, the camera housing including two cameras and two respective lenses. In a centered position, the lenses protrude beyond the front and back surfaces of the mobile device. A retention mechanism applies a force to the camera housing to retain it substantially centered in the opening unless an outside force of damaging magnitude is encountered.

19 Claims, 7 Drawing Sheets

200 401 405 201 403 203 205

PROTRUDING CAMERA LENS PROTECTION

TECHNICAL FIELD

The present disclosure is related generally to portable electronic communication devices and, more particularly, to systems and methods for protecting a protruding camera lens against damage in the event of a fall or other disturbance associated with the device.

BACKGROUND

As portable communications devices such as smartphones continue to evolve, they are trending toward decreased thickness but increased media capabilities. For example, despite the trend toward thinner devices, high-capability cameras for wide angle imaging and augmented reality/virtual reality are being incorporated into devices. However, the required optical paths for such cameras are driving camera designs that protrude beyond the housing of the mobile device itself, and in the context of a 360° camera, the curved lens may overhang both sides of the device housing. This puts the lens and associated camera hardware at risk of damage during impact, when the weight of the phone may overload the extending structure.

Before proceeding to the remainder of this disclosure, it should be appreciated that the disclosure may address some of the shortcomings listed or implicit in this Background section. However, any such benefit is not a limitation on the scope of the disclosed principles, or of the attached claims, except to the extent expressly noted in the claims.

Additionally, the discussion of technology in this Background section is reflective of the inventors' own observations, considerations, and thoughts, and is in no way intended to be, to accurately catalog, or to comprehensively summarize any prior art reference or practice. As such, the inventors expressly disclaim this section as admitted or assumed prior art. Moreover, the identification or implication herein of one or more desirable courses of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Before presenting a detailed discussion of embodiments of the disclosed principles, an overview is given to aid the reader in understanding the later discussion. As noted above, trends in device thickness and media capabilities are driving lens housing designs that protrude beyond the housing of the mobile device itself. In this configuration, the lens and camera hardware camera are at risk of damage during impact both because their external position increases the likelihood of direct impact and the weight of the remainder of the device may overload this delicate protrusion.

In an embodiment of the described principles, a floating section is employed within a host electronic device that structurally decouples the protruding camera module from the mass of the device. For example, in the case of a 360° camera module with two opposing cameras, the floating section ties both cameras maintaining image alignment requirements between the two sides. A détente may be integrated between the floating module and the host device in order to (a) prevent undesirable movement of the camera during use and (b) maintain the module depressed to protect against secondary impacts (rebounding). Further, an automated lock may be integrated between the floating module and the phone such that it releases upon sensing, e.g., with accelerometers, that the phone is undergoing a free fall.

With this overview in mind, and turning now to a more detailed discussion in conjunction with the attached figures, the techniques of the present disclosure are illustrated as being implemented in a suitable device environment. The following device description is based on embodiments and examples within which the disclosed principles may be implemented, and should not be taken as limiting the claims with regard to alternative embodiments that are not explicitly described herein. Thus, for example, while FIG. 1 illustrates an example computing device with respect to which embodiments of the disclosed principles may be implemented, it will be appreciated that other device types may be used, including but not limited to laptop computers, tablet computers, and so on.

Figure 1:
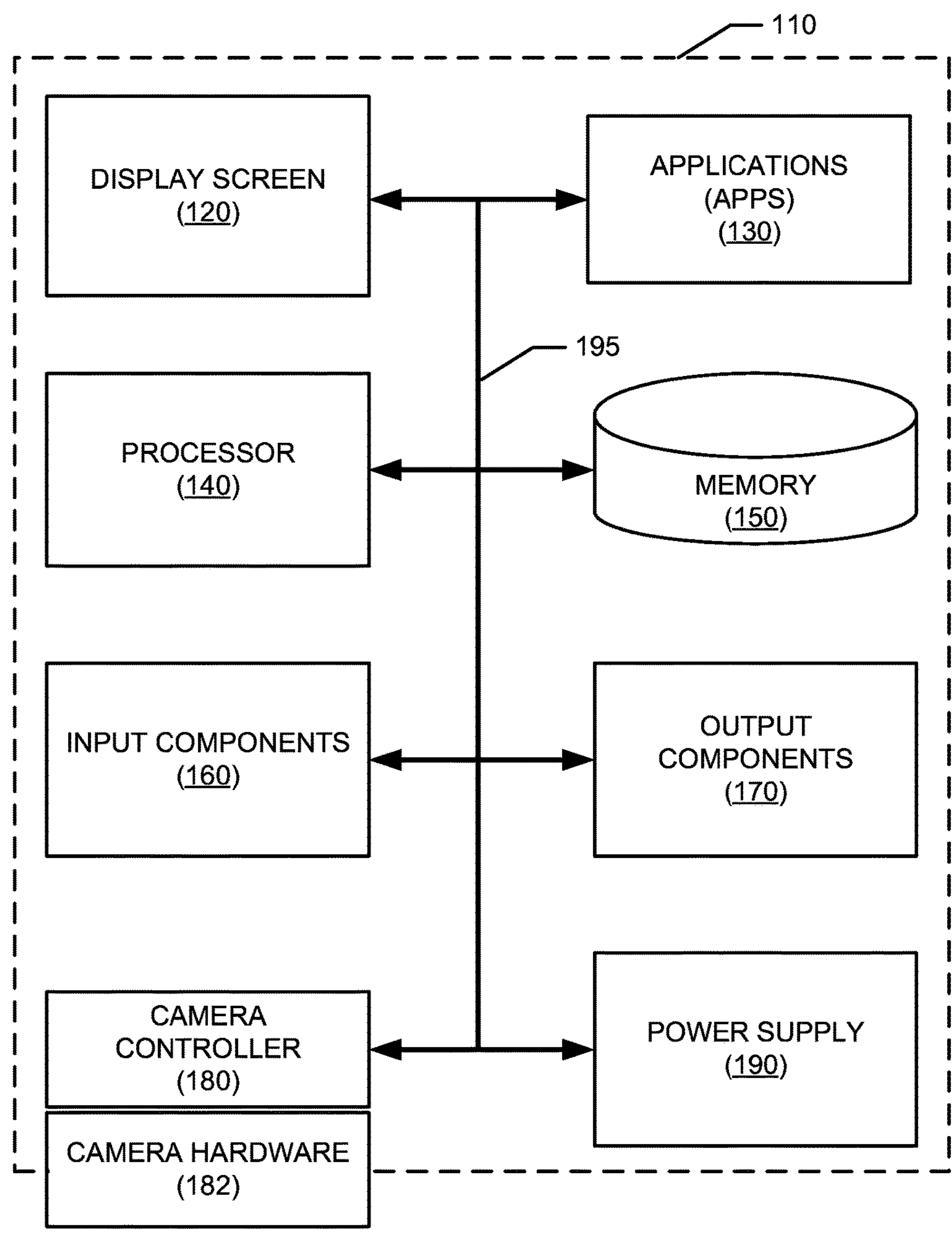
FIG. 1 is a modular view of an example electronic device usable in implementation of one or more embodiments of the disclosed principles.

The schematic diagram of FIG. 1 shows an exemplary mobile device 110 forming part of an environment within which aspects of the present disclosure may be implemented. In particular, the schematic diagram illustrates a user device 110 including example components. It will be appreciated that additional or alternative components may be used in a given implementation depending upon user preference, component availability, price point and other considerations.

In the illustrated embodiment, the components of the user device 110 include a display screen 120, applications (e.g., programs) 130, a processor 140, a memory 150, one or more input components 160 such as RF input facilities or wired input facilities, including, for example one or more antennas and associated circuitry and logic. The antennas and associated circuitry may support any number of protocols, e.g., WiFi, Bluetooth, cellular, etc. The device 110 as illustrated also includes one or more output components 170 such as RF or wired output facilities. The RF output facilities may similarly support any number of protocols, e.g., WiFi, Bluetooth, cellular, etc. and may be the same as or overlapping with the associated input facilities. It will be appreciated that a single physical input may serve for both transmission and receipt.

The processor 140 can be any of a microprocessor, microcomputer, application-specific integrated circuit, or the like. For example, the processor 140 can be implemented by one or more microprocessors or controllers from any desired family or manufacturer. Similarly, the memory 150 is a nontransitory media that may reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device or system). Additionally or alternatively, the memory 150 may include a read only memory (i.e., a hard drive, flash memory or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device 110. Such functions may include, for example, interaction among various internal components and storage and retrieval of applications and data to and from the memory 150.

These applications typically utilize the operating system to provide more specific functionality, such as file system service and handling of protected and unprotected data stored in the memory 150. Although many applications may provide standard or required functionality of the user device 110, in other cases applications provide optional or specialized functionality, and may be supplied by third party vendors or the device manufacturer.

With respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

In an embodiment, a power supply 190, such as a battery or fuel cell, is included for providing power to the device 110 and its components. Additionally or alternatively, the device 110 may be externally powered, e.g., by a vehicle battery or other power source. In the illustrated example, all or some of the internal components communicate with one another by way of one or more shared or dedicated internal communication links 195, such as an internal bus.

In an embodiment, the device 110 is programmed such that the processor 140 and memory 150 interact with the other components of the device 110 to perform a variety of functions. The processor 140 may include or implement various modules and execute programs for initiating different activities such as launching an application, transferring data and toggling through various graphical user interface objects (e.g., toggling through various display icons that are linked to executable applications).

Further, the device 110 may include a camera controller 180, as well as camera hardware 182. The camera hardware 182 may reside partially within a housing of the device 110 and partially outside of the housing, or may reside entirely outside of the housing. An example of a physical configuration of the camera hardware 182 will be discussed below by reference to FIG. 2.

Figure 2:
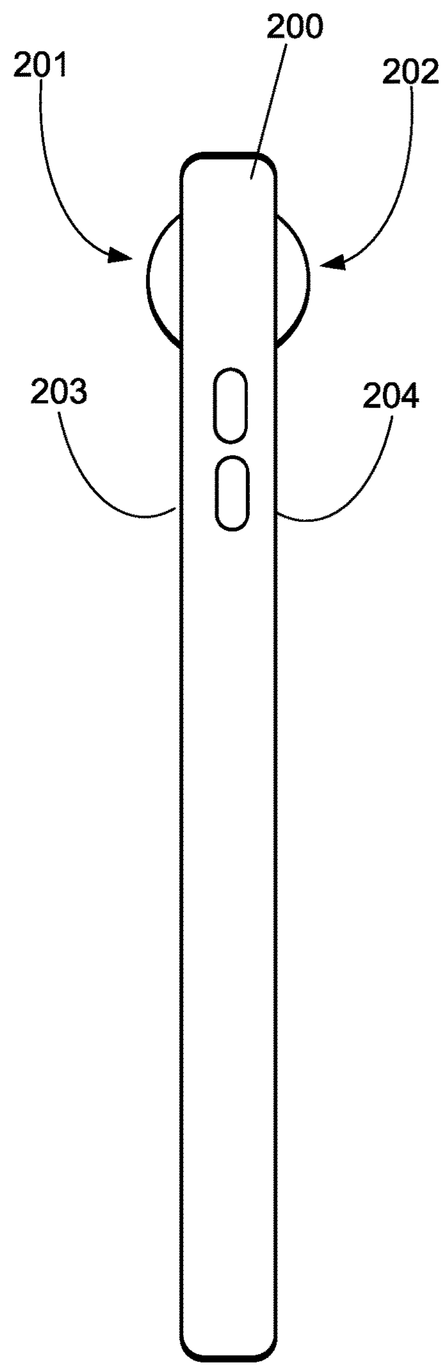
FIG. 2 is a simplified external side view of a mobile electronic device such as the device of FIG. 1, wherein the device include a plurality of protruding camera lenses.

Turning now to FIG. 2, this figure is a simplified external side view of a mobile electronic device 200, which may be a device such as device 110 discussed with reference to FIG. 1. The side view of FIG. 2 shows a first spherical lens 201 protruding from a first side 203 of the device 200 as well as a second spherical lens 202, opposed from the first, and protruding from a second side 204 of the device 200. Each lens 201, 202 is associated with an internal camera (not shown in this view).

Figure 3:
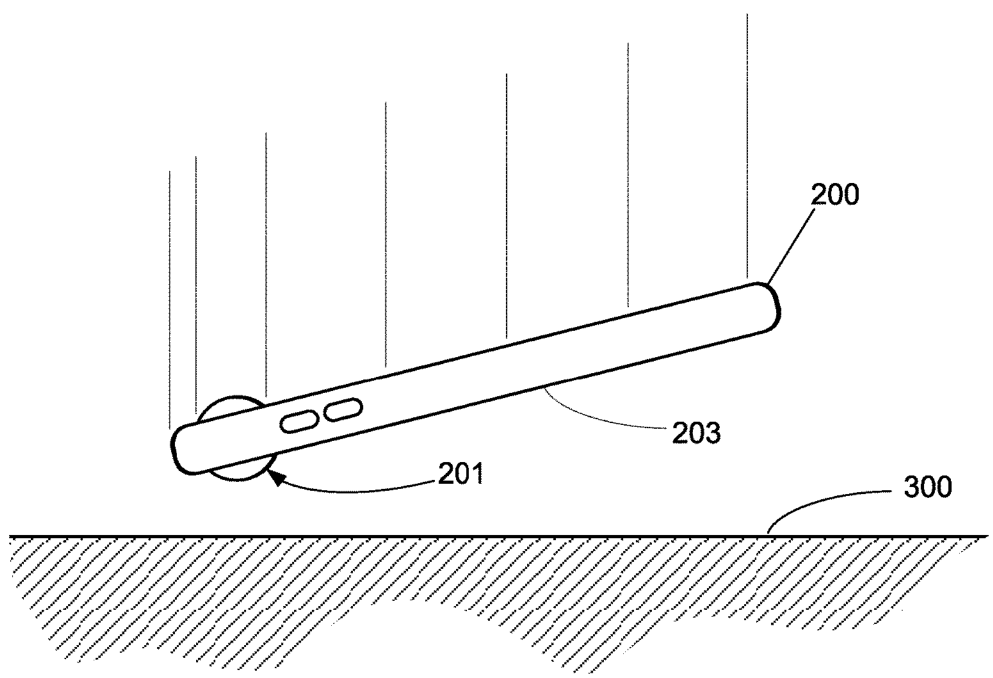
FIG. 3 is a simplified external side view of the mobile electronic device of FIG. 2, wherein the device is in a free fall attitude towards a surface.

The use of protruding spherical lenses 201, 202 allows the internal cameras to capture essentially 360° views if desired. However, the protruding lenses are subject to damage due to their prominence above the surface of the device housing. FIG. 3 illustrates this point, showing the mobile electronic device 200 in a free fall attitude towards a surface 300, such as a table top or the ground or floor.

Given the illustrated orientation and trajectory, the device 200 will strike the surface at the spherical lens 201 first. If the spherical lens 201 is fixed, as such lenses are traditionally are, then the lens 201 will likely to be damaged or destroyed by the impact. In addition, some or all of the housing and internal camera components associated with the lens 201 may also be damaged or destroyed in the fall.

In an embodiment of the disclosed principles, a unique camera mounting system is used, allowing for the use of protruding lenses for wide angle image capture while also minimizing damage to the lenses and associated components in the event of a fall. In an embodiment, elements of the mount system include a movable mount supporting both lenses and cameras, as well as flexible spring or elastic members tying the movable mount to the device.

Figure 4:
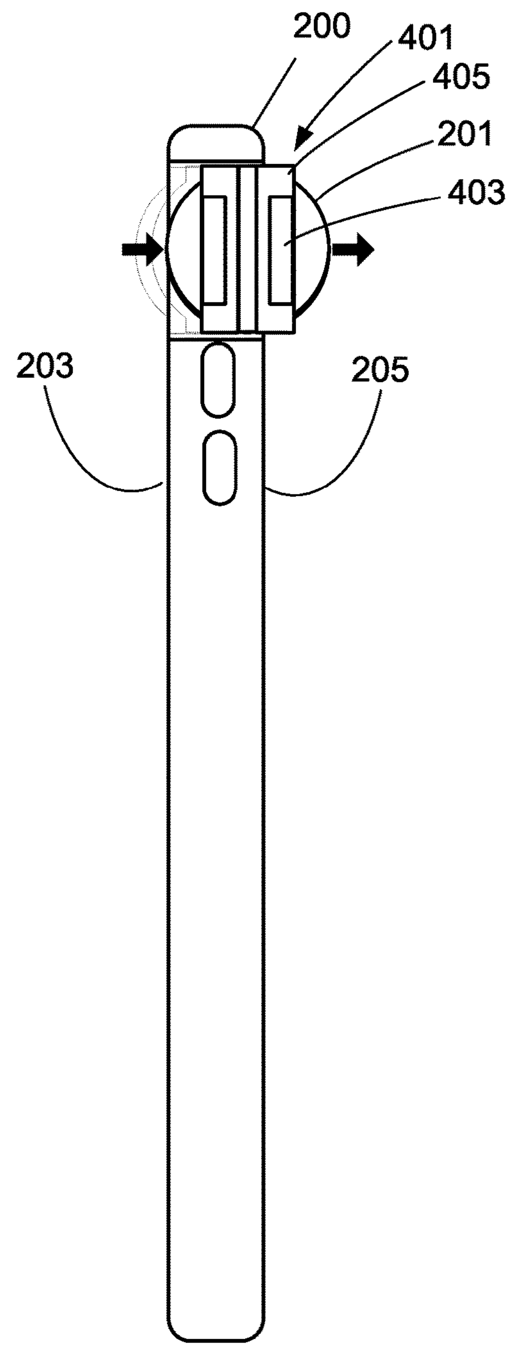
FIG. 4 is a simplified cross-sectional side view of a mobile electronic device in accordance with an embodiment of the disclosed principles.

FIG. 4 shows an example of such a mount system in a simplified cross-sectional side view. As can be seen, the mount system 401 includes two lenses 201 associated with respective image capture units 403. The image capture units may be of any suitable type, such as a charge coupled device (CCD) or other device. In the illustrated embodiment, the lenses 201 and image capture units 403 are retained and linked together by a camera housing 405. The camera housing 405 may be a multi-piece design, as shown, or may of a unitary design.

As can seen, the camera housing 405, including all retained parts, is able to move laterally within the device body. In this way, a side impact of sufficient on one lens 201 pushes the camera housing 405 as far as needed or until the affected lens 201 is essentially flush with the device housing. Electrical connections between the device 200 and the image capture units 403 may be via sliding or flexible connectors.

Figure 5:
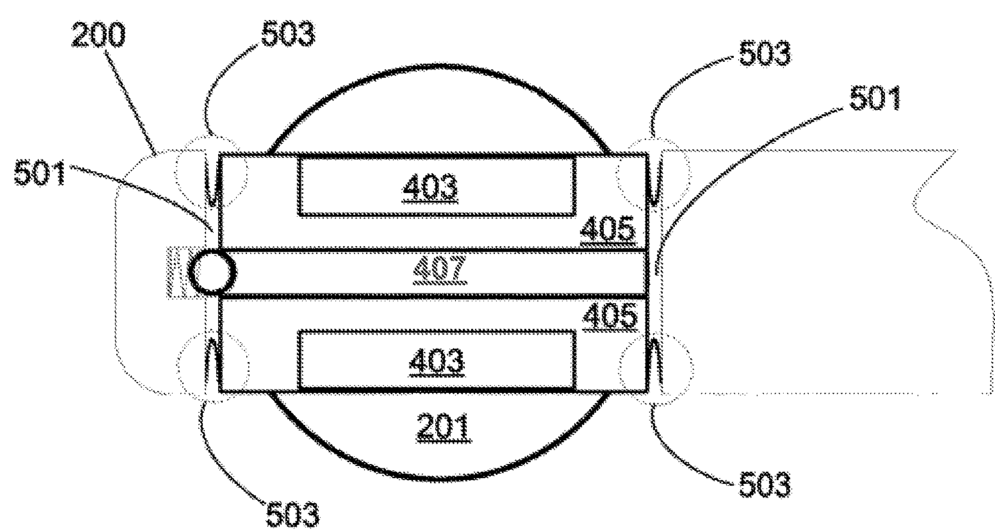
FIG. 5 is an enlarged cross-sectional side view of a mobile electronic device camera housing mechanism in accordance with an embodiment of the disclosed principles.

Further details of the camera housing 405 and its attachments are shown in FIG. 5, which is an enlarged simplified cross-sectional view of the camera housing 405, and it relationship to the device 200. The illustrated camera housing 405 is a multi-piece housing including a center portion 407 tying the two housing pieces 405 together.

The camera housing 405 is sized for a sliding fit within an opening 501 in the device 200. Multiple elastic or spring fingers bias the camera housing 405 to a centered position within the housing, at a level sufficient to overcome any attendant friction or other forces resisting sliding of the camera housing 405.

In addition, a retention mechanism such as a detent mechanism may be used to maintain the camera housing 405 in a centered position until a disturbance of sufficient magnitude is encountered. The detent mechanism may require a threshold force to move the camera housing 405 away from the centered position, and when the force abates, the camera housing 405 will return to the centered position.

Figure 6:
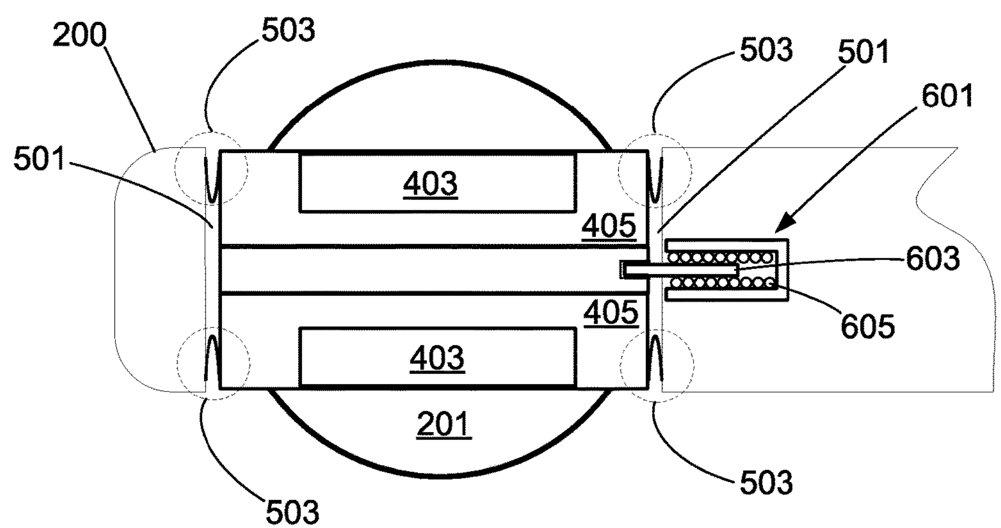
FIG. 6 is an enlarged cross-sectional side view of a mobile electronic device camera housing mechanism in accordance with an alternative embodiment of the disclosed principles.

In an alternative embodiment illustrated in FIG. 6, a lock mechanism 601 such as a pin and solenoid is used instead of or in addition to the detent mechanism as the retention mechanism. In this embodiment, the camera housing 405 remains locked in the centered position by a spring-loaded pin 603 of the lock mechanism 601 until the solenoid 605 of the lock mechanism 601 is powered (or alternatively, until the application of power is ceased). It will be appreciated that other locking mechanisms such as friction locks, magnetic locks and so on may be used.

Figure 7:
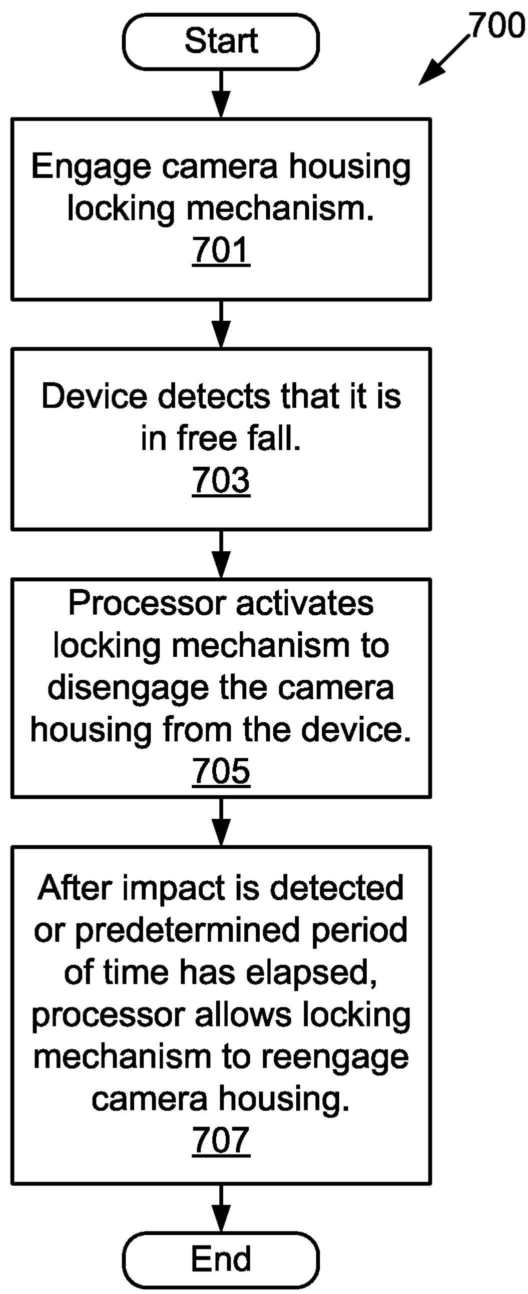
FIG. 7 is a flowchart showing a process of protecting a protruding camera lens in the event of a freefall.

In a further embodiment, the lock mechanism is triggered to unlock when the device detects a free fall of the device. Thus, for example, when the device is dropped, the camera housing 405 would become free to slide within the device 200 via the opening 501. FIG. 7 illustrated a process 700 for unlocking a slidable camera housing such as camera housing 405. At stage 701, such as when the device 200 is powered on, the camera housing 405 locking mechanism 401 is engaged, locking the camera housing 405 is place within the opening 501.

At stage 703, the device detects, e.g., via one or more accelerometers, that the device is in free fall, as it might be if it has been dropped by the user. At stage 705, a processor such as device processor 140 or camera controller 180 activates the locking mechanism 401 to disengage the camera housing 405, e.g., by withdrawing pin 603 under power of solenoid 605. At this point, the camera housing 405 is either free to slide or slidable under the application of a suitable threshold force. If the device 200 then impacts a surface, making contact with the surface via one of the lenses 201, the camera housing 405 will slide into the device 200, minimizing damage to the lenses 201 or cameras 403. At the final stage 707, when a predetermined period of time has elapsed or an impact is detected, the processor may thereafter allow the locking mechanism to reengage the camera housing 405.

Although the examples herein employ both detents and locking mechanisms, it will be appreciated that in some embodiment, neither is required. For example, in an embodiment, the fingers 503 are used to center the camera housing 405 and to return it to center after an impact event. Although centering of the camera housing 405 may not be as precise in this embodiment, it may still be sufficient for high quality wide angle imaging and augmented reality/virtual reality image capture. This is especially true when the return force of the fingers 503 is nonlinear.

It will be appreciated that various systems and processes for protecting a protruding camera lens in a mobile device in the event of an impact have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A mobile device comprising:

a device housing having an opening there through, the device housing having a front external surface and a back external surface, such that opening appears in both the front external surface and a back external surface;

a camera housing sized to fit within the opening in the device housing in a centered relation to the device, and having at least one camera and at least two lenses associated with the at least one camera, the two lenses protruding respectively beyond the front external surface and the back external surface when the camera housing is in the centered relation to the device; and a retention mechanism applying a force to the camera housing to retain the camera housing substantially centered in the opening unless an outside force of damaging magnitude is encountered.

2. The mobile device in accordance with claim 1, wherein the retention mechanism comprises one or more spring elements affixed to both the camera housing and the device.

3. The mobile device in accordance with claim 2, wherein the one or more spring elements include one or more metallic spring elements.

4. The mobile device in accordance with claim 2, wherein the one or more spring elements include one or more elastomeric spring elements.

5. The mobile device in accordance with claim 1, wherein the retention mechanism comprises a detent movably securing the camera housing in place within the opening.

6. The mobile device in accordance with claim 1, wherein the retention mechanism also includes a movable pin securing the camera housing in place within the opening.

7. The mobile device in accordance with claim 6, further comprising an actuator to disengage the movable pin such that the camera housing can move within the opening.

8. The mobile device in accordance with claim 7, wherein the actuator is an electrically actuated solenoid.

9. The mobile device in accordance with claim 7, further comprising a processor configured to detect that the device is falling and in response to disengage the movable pin.

10. The mobile device in accordance with claim 1, wherein the device is electrically connected to the at least one camera via one of a flex circuit and a sliding contact.

11. A method of protecting protruding camera lenses on a mobile device from impact damage, the method comprising:

placing the lenses over a camera in a camera housing configured to retain both the lenses and the camera;

placing the camera housing into an opening in the mobile device, the opening being shaped to accept the camera housing and passing completely through the device;

retaining the camera housing in a substantially centered position in the opening via a retention mechanism applying a force to the camera housing, wherein an outside force of a predetermined magnitude is sufficient to cause the camera housing to leave the substantially centered position and wherein an outside force of less than the predetermined magnitude is insufficient to cause the camera housing to leave the substantially centered position.

12. The method of protecting one or more protruding camera lenses in accordance with claim 11, wherein retaining the camera housing in a substantially centered position in the opening via a retention mechanism comprises retaining the camera housing in the substantially centered position in the opening via one or more spring elements affixed to both the camera housing and the device.

13. The method of protecting one or more protruding camera lenses in accordance with claim 12, wherein the one or more spring elements include one or more metallic spring elements.

14. The method of protecting one or more protruding camera lenses in accordance with claim 12, wherein the one or more spring elements include one or more elastomeric spring elements.

15. The method of protecting one or more protruding camera lenses in accordance with claim 11, wherein retaining the camera housing in a substantially centered position in the opening via a retention mechanism comprises retaining the camera housing in the substantially centered position in the opening via one or more detents.

16. The method of protecting one or more protruding camera lenses in accordance with claim 11, wherein the retention mechanism also includes an electrically actuatable pin securing the camera housing in place within the opening.

17. The method of protecting one or more protruding camera lenses in accordance with claim 16, further comprising detecting that the device is falling and, in response, disengaging the movable pin.

18. A mobile device comprising:

a camera housing that holds a camera and a camera lens;

an opening entirely through the mobile device and sized to accept the camera housing; and a camera housing retention mechanism that retains the camera housing in a centered position in the opening wherein the lens protrudes from the device, wherein the retention mechanism is overcome if the camera lens experiences an impact.

19. The mobile device in accordance with claim 18, wherein the camera housing retention mechanism includes at least one of a detent, a spring, and a pin lock.

* * * * *